United States Patent [19]

Whitehead

[11] Patent Number: 4,662,728

[45] Date of Patent: May 5, 1987

[54] LIGHT GUIDE APPARATUS

[75] Inventor: Lorne A. Whitehead, Vancouver, Canada

[73] Assignee: Canadian Patents and Development Limited, Ottawa, Canada

[21] Appl. No.: 527,494

[22] Filed: Aug. 29, 1983

[51] Int. Cl.⁴ .................. G02B 23/00; G02B 27/00
[52] U.S. Cl. .................................................. 350/573
[58] Field of Search .................. 350/574, 260, 96.18, 350/573

[56] References Cited

U.S. PATENT DOCUMENTS

| | | | |
|---|---|---|---|
| 3,101,472 | 8/1963 | Goubau | 350/96.18 |
| 3,200,697 | 4/1961 | Goubau | |
| 3,628,861 | 12/1971 | Goubau | 350/96.18 |
| 3,632,955 | 1/1972 | Cruickshank et al. | 350/433 |
| 3,759,590 | 9/1973 | Arnaud | |
| 4,029,395 | 6/1977 | Hurwitz | |
| 4,411,490 | 10/1983 | Daniel | 350/96.18 |

FOREIGN PATENT DOCUMENTS

| | | |
|---|---|---|
| 2713737 | 5/1978 | Fed. Rep. of Germany . |
| 940120 | 7/1982 | U.S.S.R. . |

OTHER PUBLICATIONS

Lit et al., "Hybrid Lens Beam Waveguide", Applied Optics, vol. 12, No. 4, Apr. 1973, pp. 749-754.
Optical Engineering, vol. 20, No. 4, Jul./Aug. 81, pp. 605-607, Bellingham Wash. M. V. R. K. Murty.
Soviet Inventions Illustrated Derwent Publ. Sec. Phys. Week K20 Abstract No. G 7040, p. 81, 29-6-83.

Primary Examiner—John K. Corbin
Assistant Examiner—Vincent J. Lemmo
Attorney, Agent, or Firm—Edward Rymek

[57] ABSTRACT

The light guide apparatus will guide a beam whose rays have a predetermined phase space distribution with a maximum deviation angle $\theta_{max}$ in a first plane perpendicular to the beam axis. The guiding apparatus includes an optical system positioned at a distance l/2 from the first plane for receiving light from the edge of the spreading beam along an edge of width $l \tan \theta_{max}$ and for diverting the light towards the beam axis to reproduce the predetermined spatial distribution in a second plane perpendicular to the beam axis at a distance l from the first plane. The optical system can be made from annular or cylindrical, regular or fresnel lenses. A number of systems may be sequentially mounted to guide a beam along any desired distance with in a straight line or perpendicular to its original direction.

8 Claims, 13 Drawing Figures

LIGHT GUIDE APPARATUS

BACKGROUND OF THE INVENTION

This invention is directed to a light guiding system, and in particular, to a light guiding system capable of guiding large quantities of energy.

As exemplified by U.S. Pat. No. 247,229, which issued to W. Wheeler on Sept. 20, 1881, the illumination of entire buildings by a central lighting system has long been desired because of its many advantages. The piping of light from a central source brings about efficiencies due to the source size and source location. Such a system allows direct sunlight to be used as a source. In addition, a central lighting system would provide cool light at its outlets with the heat being expended at the source.

Presently, there are two basic techniques of guiding light energy. The first technique, exemplified by U.S. Pat. No. 2,362,175, which issued to H. Swanson on Nov. 7, 1944, employs a dielectric waveguide, which is a solid rod made of transparent material. The light rays are reflected inward by the surface of the rod in a process known as total internal reflection. This process is nearly 100% efficient in containing the light, but unfortunately all reasonably priced transparent materials actually absorb most of the light in relatively short distances, i.e. within a few centimeters to a few meters. The method is therefore used mainly in optical communications systems, where small quantities of extremely expensive dielectric material are used.

In the second technique, light propagates mainly through air, and is periodically redirected to keep it confined and travelling in the correct direction. There are four methods of accomplishing this redirection, including a very recent prism light guide system which is described in U.S. Pat. No. 4,260,220, which issued on Apr. 7, 1981, in the name of Lorne A. Whitehead. This method uses a prism light guide which is made from a longitudinal hollow structure of transparent dielectric material. The walls of the structure are formed such that their inner and outer surfaces are in octature.

In a second method, a hollow pipe with a mirrored inner surface is used to keep the light travelling down the pipe, such a pipe is shown in U.S. Pat. No. 3,700,900, which issued to J. A Herleikson on Oct. 22, 1972.

In a third method which is illustrated in U.S. Pat. No. 3,583,786, issued to E. A. J. Marcatili on June 8, 1971, the pipe consists of an inner cylinder, usually air, surrounded by pairs of dielectric layers wherein the losses are purported to decrease with the number of pairs of layers.

The fourth method is exemplified by U.S. Pat. No. 3,506,331, which issued to R. Kompfner on Apr. 14, 1970, and uses focussing lenses or mirrors at intervals down a hollow pipe.

In a publication by J. W. Y. Lit and D. L. Van Rooy, Appl. Opt. 12, 749, 1973, it is shown that it is possible to guide light energy with a system in which optical elements are restricted to the periphery, as is illustrated in FIG. 1 of the publication. However, in the Lit et al system, the focal points of the lenses lie on the optical axis of the system. In terms of application, the system of Lit et al is suited for guiding light which is diverging principally as a result of diffraction, such as from a laser beam.

SUMMARY OF THE INVENTION

It is therefore an object of the invention to provide light guiding apparatus for guiding incoherent light from conventional light sources.

This and other objects are achieved in a guiding apparatus for a beam of light whose rays have a predetermined phase space distribution with a maximum deviation angle $\theta_{max}$ in a first plane perpendicular to the beam axis. The apparatus has an optical system positioned at a distance $l/2$ from the first plane on the beam axis in order to receive the light from the edge of the spreading beam along an edge of width, $w = l \tan \theta_{max}$ and then to divert the light towards the beam axis to reproduce the predetermined spatial distribution in a second plane perpendicular to the beam axis at a distance $l$ from the first plane. Any number of such optical systems may be positioned sequentially at a distance $l$ from one another in order to guide the beam any desired distance.

The optical system may include one or more lenses having a width $=w$, a focal length $f=l/2$ and a focus located a distance $w/2$ from the edge of the beam. This lens may be annular to encircle the beam. Alternately, four cylindrical lenses may be used to form a square with the beam axis at its center. The cylindrical lenses may overlap in the corners of the square to redirect the edge of the beam in the corners, or the ends of the cylindrical lenses may meet in the corners of the square with further quarter spherical lenses of focal length $f$ filling in the corners of the square. In addition, all of the above lenses may be fresnel lenses.

In accordance with another aspect of the invention, the guiding apparatus may include two optical systems positioned in two planes at a predetermined angle $\phi$ to one another, and a planar mirror positioned at an angle of $\phi/2$ to the two planes. This guiding apparatus will deflect the beam at a $\phi$ angle to itself while the beam is being contained. For right angle corners, $\phi$ will be 90°.

Many other objects and aspects of the invention will be clear from the detailed description of the drawings.

DETAILED DESCRIPTION

The invention described herein consists of a peripheral optical system which, in the absence of diffraction and optical imperfections, can ideally guide inherently divergent light with zero loss. Since such a system will be used in situations where diffraction effects are insignificant, it is simplest to describe the invention in terms of geometric optics.

Figure 1:
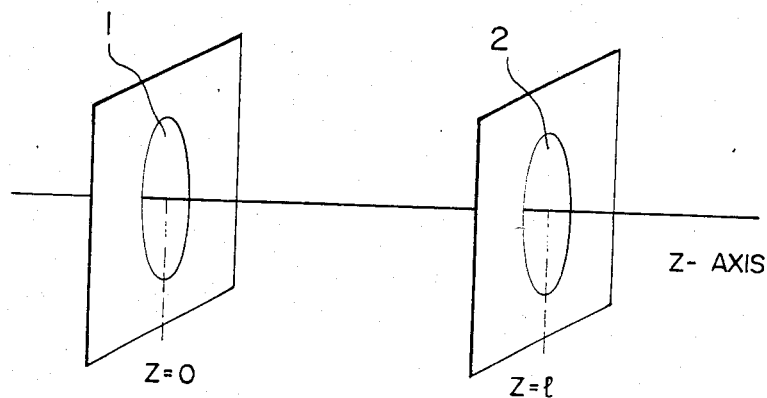
FIG. 1 illustrates the basis of the present invention.

From this point of view, the basis of the invention may be stated in the following manner with reference to FIG. 1. At a point $z=0$ on the z-axis, there is an aperture 1 in the plane perpendicular to the axis through which light passes. The light consists of rays which have a range of angles, but all of which have a positive z component. The device between point $z=0$ and $z=1$ must cause the light rays to propagate in such a way that at a point $z=1$ on the z axis, all of the rays will pass through an aperture 2 identical to aperture 1 at $z=0$, and will have a range of angles identical to that at $z=0$.

In other words, at the point $z=0$ in the optical system, each ray has a position in the x,y plane, and angles measured in each perpendicular direction, $\theta_x$, $\theta_y$. Thus there is a distribution of rays in the four dimensional "phase space" defined x, y, $\theta_x, \theta_y$ and the purpose of the system is to reproduce this distribution at the point $z=1$. The problem can be vastly simplified without invalidating the results by considering the x and y dimensions separately. In most cases, the distributions in these two directions will be identical, and virtually no information is lost by this simplification. This is particularly the case when the maximum angular deviation from the z-axis, $\theta_{max}$, is considerably smaller than 1 radian, as is always the case in practice.

Figure 2:
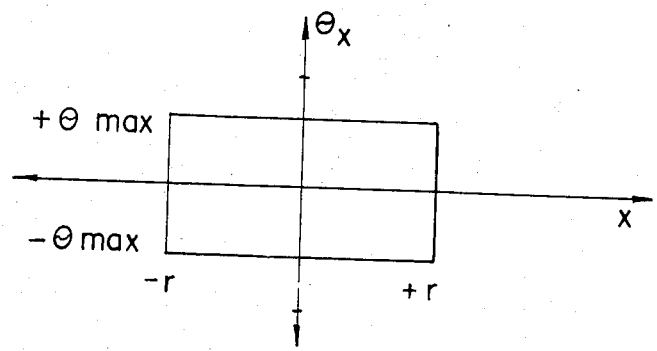
FIGS. 2, 3 and 4 illustrate the phase space distribution of a beam at various positions along the Z-axis.

FIG. 2 represents the distribution of light rays at the point $z=0$, in the phase space defined by x, $\theta_x$. As can be seen, all rays lie in a rectangular region for which the x value is between $-r$ and $+r$, where r is the half-width of the aperture, and for which the $\theta_x$ value is between $-\theta_{max}$ and $+\theta_{max}$ where $\theta_{max}$ is the maximum angular deviation from the z-axis which any ray initially has. The purpose of the peripheral optical system is to reproduce this distribution at a point $z=1$ on the z-axis, and by simple repetition of such a system, to further reproduce the distribution at the points 21, 21, etc., as desired.

Figure 3:
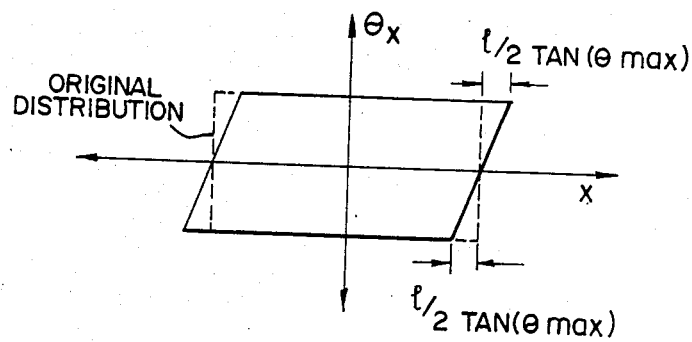

FIG. 3 shows how the distribution in phase space has changed as the light travels a distance l/2 along the z-axis. By the principle of reversibility of light rays, it might be expected that there is a distribution of rays in phase space which would have the property that after propagating a distance l/2 down the z-axis, the phase space distribution would become that of FIG. 2 which it is desired to obtain at the point $z=1$. The required distribution to achieve this is shown in FIG. 4.

Figure 4:
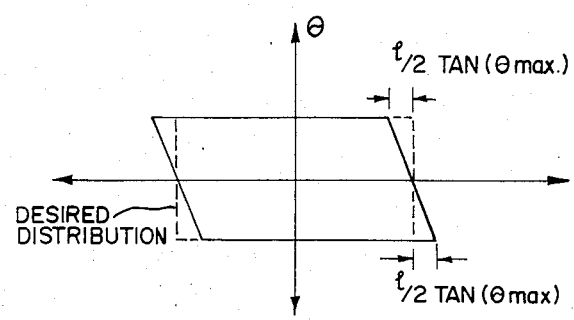
Figure 5:
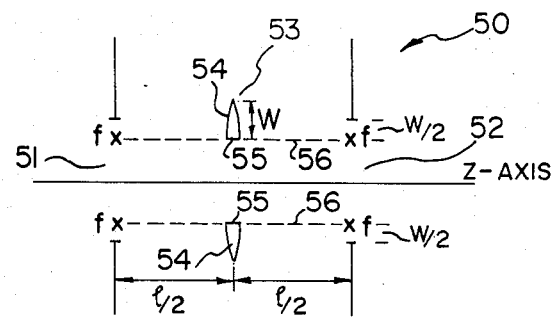
FIG. 5 illustrates a basic optical system in accordance with the present invention.

It is therefore necessary to provide an optical system which can transform the distribution in FIG. 3 into the distribution in FIG. 4 since this will provide a beam with the distribution in FIG. 2 at the point l. A schematic of such a system 50 is shown in FIG. 5. Beam entrance and exit apertures are represented by 51 and 52, respectively, and are located a distance l apart on the z-axis. At the mid-point between the apertures 51, 52 is situated a thin lens optical system 53. The lens optical system 53 may be made from various types of lenses as will be described, however, the lens 54 must have the following parameters. The lens 54 will have a focal length $f=l/2$, a width $w = l \tan\theta_{max}$, and an f# of $\frac{1}{4}\tan\theta_{max}$. The lens 54 is at the mid-point between the apertures 51, 52 such that the focal points f are in the plane of the apertures 51, 52, and at a distance w/2 from the edge of the apertures 51, 52. The inside edge 55 of the lens 54 is on the optical axis 56 of the lens 54.

Figure 6:
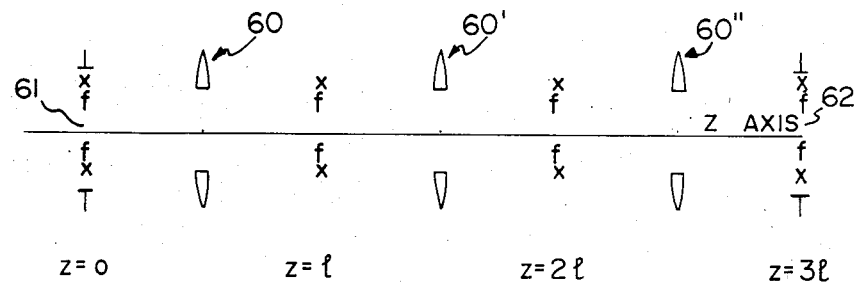
FIG. 6 illustrates a guiding apparatus with sequential optical systems.

The system 50 can be repeated sequentially along the z-axis as shown in FIG. 6. Three lens systems 60, 60', 60", each with a focal length $f=l/2$ are positioned along the z-axis at $z=l/2$, $z=3l/2$ and $z=5l/2$, respectively, from entrance aperture 61. As in the single system, the phase space distribution at points $z=l$, $z=2l$ and $z=3l$, the exit aperture 62 will be the same as at the entrance aperture 61, resulting in a beam guided a distance 3l with low losses.

This concept of peripheral optics phase space modification for the purpose of light guidance can be generalized to many systems. At small distances down the light guide, only the peripheral regions have angular distributions which differ from that required to reproduce the initial distribution at a subsequent point down the light guide, this modification can then be made by a peripheral optical system. Moreover, the present invention can be applied to systems in which the propagation direction is changed at some point along the z-axis to a new direction z', and in which the phase space distribution of FIG. 2 is to be reproduced in the new cross-sectional plane perpendicular to that axis.

The above optical system 50 or 60, which redirect the edge of the beam, may be made with mirror(s), lens(es), or both. However, for most applications lenses are preferred since they absorb less of the light. The optical mirrors or lenses may be annular and be positioned around the circumference of a circular cross-section beam. If the beam is square or rectangular, the mirror or lens systems 50, 60 may be placed down one or more sides of the beam as desired.

Figure 7:
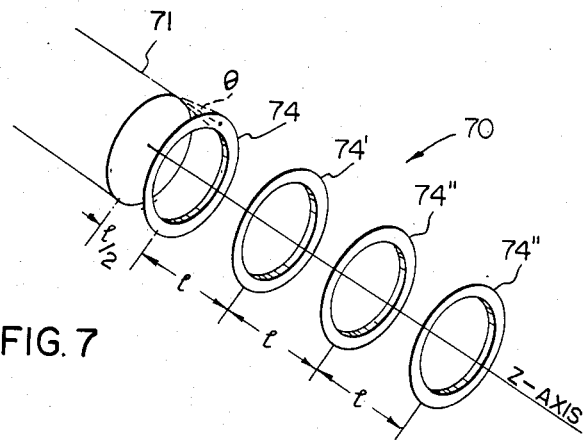
FIG. 7 illustrates an annular lens guiding apparatus.

An orthogonal view of a multiple annular lens 74 light guide system 70 is shown in FIG. 7 where 71 is a light source on the z-axis with a beam having an angular deviation up to $+\theta$. Annular half lenses 74, 74', 74", ..., are placed on the beam z-axis with the first lens at a distance f or l/2 from the light source 71 and additional annular lenses placed sequentially at a distance 2f or l apart. Each lens guides the beam a distance l. Lenses 74, 74', 74", ... may be regular or fresnel lenses.

Figure 8:
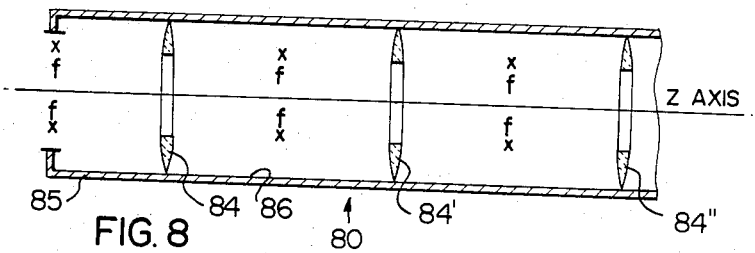
FIG. 8 illustrates an annular lens guiding apparatus within a mirrored cylinder.

This light guide system 70 could be used as a stand alone system with the appropriate support structure or it could be placed inside a reflective system to increase its efficiency. An example of an annular lens system 80 inside a cylindrical tube with an inner mirrored surface, is shown in cross-section in FIG. 8. The lenses 84, 84', 84", ... are supported with a cylinder 85 which has a mirrored inner surface 86. In this way, the small portion of the light lost from the lenses as a result of lens scatter, aberrations, and inaccuracies would remain confined by the mirror 86 and so would not be entirely lost from the guiding system 80. While absorption would take place for light striking the mirror 86, this effect would be confined to light which would otherwise be lost to the system, and overall efficiency is thus improved.

Figures 9, 10:
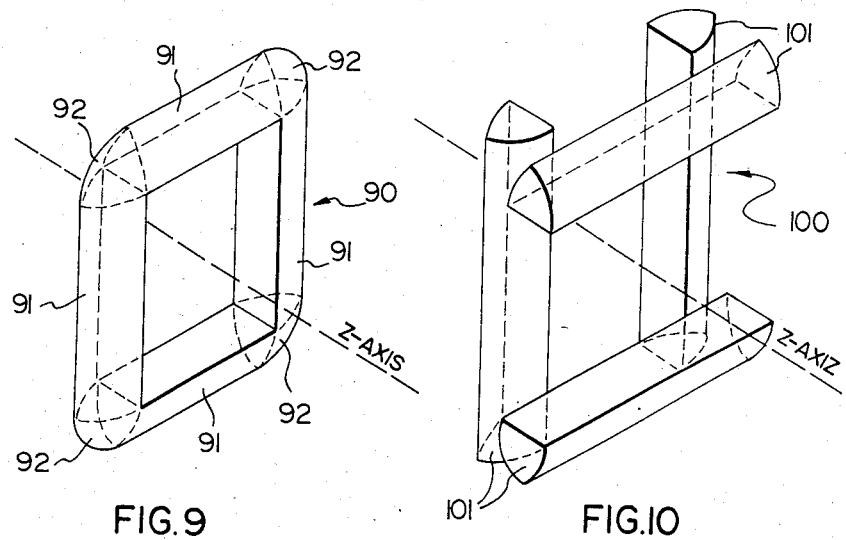
FIGS. 9 and 10 illustrate cylindrical lens optical systems.

If a square or rectangular beam is being transmitted, the optical system may be constructed from regular or fresnel cylindrical lenses. FIGS. 9 and 10 show two alternatives for dealing with the corner regions of the beam, for conventional cylindrical lenses. In FIG. 9, the system 90 includes four cylindrical lenses 91 positioned to form a square. The corner sections 92 are made from one quarter of a spherical lens of the same focal length f. In the system 100 shown in FIG. 10, the cylindrical lenses 101 are made to overlap. These two approaches are approximately equivalent for $\theta_{max} \ll 1$ radian, but may differ in cost of implementation or efficiency.

Figures 11, 12:
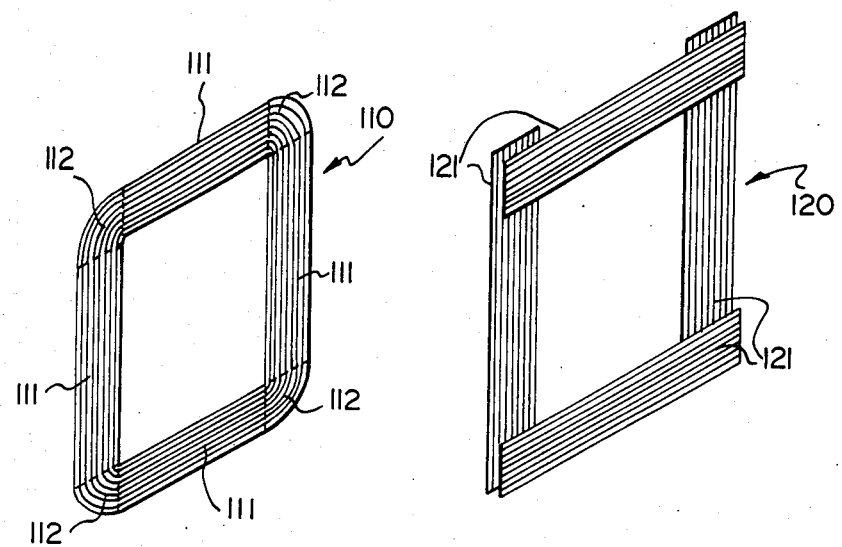
FIGS. 11 and 12 illustrate fresnel lens optical systems.

The systems 110 and 120, shown schematically in FIGS. 11 and 12, are analogues of the systems in FIGS. 9 and 10, however using fresnel lenses. In FIG. 11, the system 110 includes four cylindrical fresnel lenses 111 and for spherical fresnel lens quarters 112, while in FIG. 12, the system 120 includes four overlapping cylindrical fresnel lenses 121. Again, the two systems are approximately equivalent but may differ in cost and efficiency.

Figure 13:
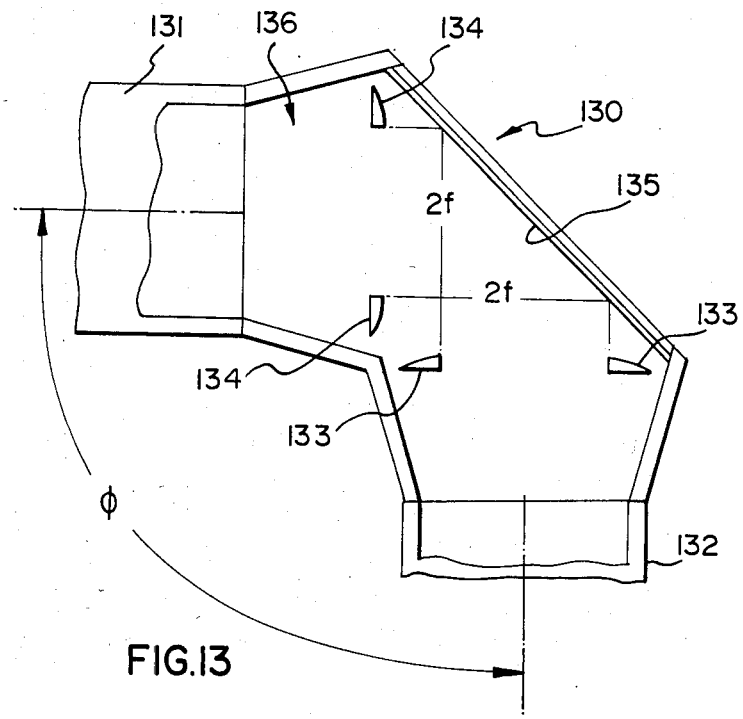
FIG. 13 illustrates a 90° corner light guiding apparatus.

The present light guide system can also be used in conjunction with the prism light guide described in the above noted U.S. Pat. No. 4,260,220, and finds particular application as a device for guiding light around a corner having an angle of $\phi$ degrees, where $\phi$ can range from nearly 0° to nearly 180°. This angle is limited by structural constraints. A schematic of a corner having an angle $\phi = 90°$, for a square light guide is shown in FIG. 13. The corner 130 is used to guide light from one section of light guide 131, which may be prismatic, to a second section of light guide 132. These light guide sections form the entrance and exit apertures for the corner 130. The corner 130 includes two pairs, 133, 134, of cylindrical convex lenses placed at a focal length f from the light guide sections 131 and 132, respectively. Further lenses may be used at the top and bottom in the bending plane, however, it has been found that mirrors 136 can be used to guide the light in this situation without undue absorption losses, and in addition, the lenses 132, 133, may be glued to these mirrors 136. A further planar mirror 135 is positioned at an angle $\phi/2$ to the beam axis such that the distances d between the mirror 135 and the lenses 132 and 133 add up to 2f. In this case, $\phi/2 = 45°$.

Many modifications in the above described embodiments of the invention can be carried out without departing from the scope thereof and, therefore, the scope of the present invention is intended to be limited only by the appended claims.

I claim:

1. Apparatus for guiding a spreading beam of light whose rays have a predetermined phase space distribution with a maximum deviation angle $\theta_{max}$ at a first aperture perpendicular to the beam axis, along a predetermined distance nl to a further aperture perpendicular to the beam axis, where n is a whole number greater than 1, comprising: n optical systems positioned sequentially along the beam axis with a spacing l between each of the optical systems and with the initial optical system positioned at the distance l/2 from the first aperture, each of the optical systems receives light from the edge of the beam along a width $w = l \tan \theta_{max}$ and diverts the light towards the beam axis thereby reproducing the beam phase space distribution found in a first plane perpendicular to the beam axis preceding the optical system by a distance l/2 at a second plane perpendicular to the beam axis at a distance l from the first plane, wherein each of the optical systems is a peripheral lens system having a lens width = w, a focal length l/2 and a focus located at each of the first and second planes of each respective optical systems and at a distance w/2 from the edge of the beam towards the beam axis.

2. Apparatus as claimed in claim 1 wherein each peripheral lens system consists of an annular lens.

3. Apparatus as claimed in claim 1 wherein each peripheral lens system includes four cylindrical lenses of focal length f and width w positioned to form a square about the beam axis.

4. Apparatus as claimed in claim 3 wherein the cylindrical lenses overlap in the corners of the square.

5. Apparatus as claimed in claims 2, 3 or 4 wherein each lens is a fresnel lens.

6. Apparatus as claimed in claim 3 wherein the ends of the cylindrical lenses meet in the corners of the square and the optical system further includes a quarter spherical lens of focal length f in each corner.

7. Apparatus as claimed in claim 1 in which the guiding apparatus includes two optical systems positioned in two planes at an angle $\phi$ to one another, and the guiding apparatus further includes a planar mirror positioned at an angle $\phi/2$ to the two perpendicular planes to reflect the beam at an angle $\phi$ to itself.

8. Apparatus as claimed in claim 7 where $\phi$ is approximately 90°.

* * * * *